United States Patent [19]

Akao

[11] 4,288,278
[45] Sep. 8, 1981

[54] APPARATUS FOR CONTINUOUSLY PRODUCING PLEATED SEMIPERMEABLE MEMBRANE ELEMENTS

[75] Inventor: Hisataro Akao, Sakai, Japan

[73] Assignee: Daicel Chemical Industries Ltd., Osaka, Japan

[21] Appl. No.: 100,237

[22] Filed: Dec. 4, 1979

[30] Foreign Application Priority Data

Dec. 8, 1978 [JP] Japan .................................. 53-152326
May 12, 1979 [JP] Japan .................................. 54-58321

[51] Int. Cl.³ ............................................. B31F 1/34
[52] U.S. Cl. ..................................... 156/474; 156/204
[58] Field of Search ............... 156/443, 474, 204, 226, 156/227; 53/111 R, 116, 117, 120, 520, 527, 429, 500, 284, 526; 83/208

[56] References Cited

U.S. PATENT DOCUMENTS

| | | | |
|---|---|---|---|
| 2,801,671 | 8/1957 | Vaugh et al. | 156/474 X |
| 3,262,242 | 7/1966 | Godschaly | 53/500 X |
| 3,269,091 | 8/1966 | Martin | 53/526 X |
| 3,805,474 | 4/1974 | Gerstein | 53/520 X |
| 3,957,386 | 5/1976 | Lupke | 83/208 X |

*Primary Examiner*—David A. Simmons
*Attorney, Agent, or Firm*—Hubbell, Cohen, Stiefel & Gross

[57] ABSTRACT

An apparatus comprising a mechanism for loosely folding a strip of assembly of a synthetic resin semipermeable membrane and a spacer in pleats of uniform or uneven width, and a mechanism for completely folding the folded portion of the assembly within a holding case. A plurality of such holding cases are utilized to prepare completely folded portions of assembly in succession as individually held in the cases to obtain pleated semipermeable membrane elements by a continuous operation.

12 Claims, 29 Drawing Figures

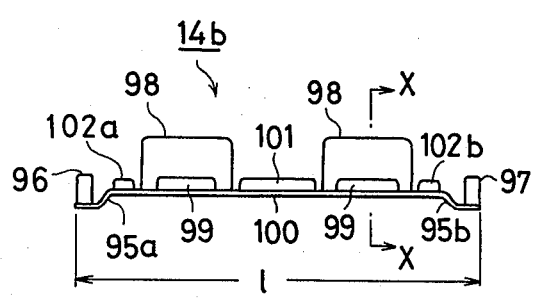
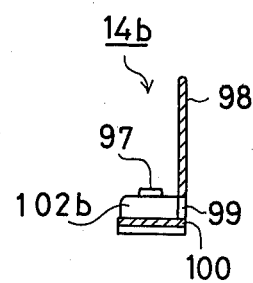
FIG. 12
FIG. 13
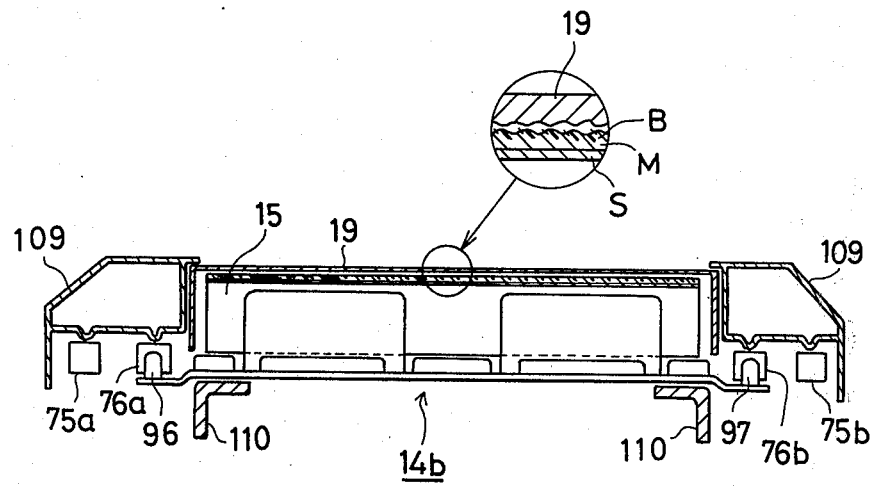
FIG. 14

APPARATUS FOR CONTINUOUSLY PRODUCING PLEATED SEMIPERMEABLE MEMBRANE ELEMENTS

BACKGROUND OF THE INVENTION

1. Field of the Invention

This invention relates to an apparatus for continuously producing pleated semipermeable membrane elements each enclosed in a pressure-resistant container for use in the separation, concentration and purification of fluids.

2. Description of the Prior Art

Precision filtration, ultrafiltration, reverse osmosis and like processes, which utilize membranes, have found wide use for the separation, purification and concentration of fluids, for the production of water, and for the treatment of industrial effluents. Semipermeable membranes useful for these applications are divided basically into four types: tubular, spirally wound, hollow fiber, and plate-and-frame. Of these types, the spirally wound type has been used most extensively. Besides these, pleated semipermeable membrane elements have been introduced into use in recent years (U.S. Pat. No. 3,266,223, and U.S. patent application Ser. No. 906,076, filed May 15, 1978).

SUMMARY OF THE INVENTION

The object of this invention is to provide an apparatus for commercially and continuously producing pleated semipermeable membrane elements.

The apparatus of the invention comprises means for continuously feeding an assembly in the form of a strip composed of a synthetic resin semipermeable membrane and a spacer in the form of a thin sheet and superposed on at least one side of the semipermeable membrane, folding means having a pair of upper and lower folding blades for loosely folding the assembly fed by the feeding means, adhesive applying means disposed within, or to the front or rear of the folding means for applying an adhesive to the opposite selvage portions of the assembly on one side thereof, transfer means for placing the folded portion of the assembly into the holding case to be mentioned below while progressively folding the assembly more compactly, holding cases each having an openable lid at each of its inlet and outlet, counter means disposed in the vicinity of the inlet of the holding case for counting the number of the pleats of the folded assembly, cutter means disposed on the inlet side of the holding case for cutting off the folded portion of the assembly, compressing means disposed on the outlet side of the holding case for compressing the folded assembly in the holding case, and means for selecting one of the holding cases and supplying the same for encasing the folded assembly portion.

One of the features of the present apparatus is that the apparatus has means by which a strip of assembly composed of a synthetic resin semipermeable membrane and a spacer is loosely folded into a pleated element first. The folding means further has a mechanism for folding the strip to either a uniform or an uneven width.

The apparatus of this invention has another feature comprising means for completely folding the loosely pleated element within a holding case. Additionally the apparatus includes means for supplying holding cases so as to produce pleated semipermeable membrane elements in succession.

The pleated semipermeable membrane element of this invention is formed basically by folding a strip of synthetic resin semipermeable membrane longitudinally thereof to provide feed channels on one side thereof and filtrate channels on the other side thereof. The strip is provided with a spacer on the side forming the feed channels and with a spacer and/or a cloth backing at least at its opposite selvage portions on the other side forming the filtrate channels. Each of the selvage portions only is liquid-tightly adhered to itself.

Other features and objects of the invention will become more apparent from the following description of the invention.

BRIEF DESCRIPTION OF THE DRAWINGS

FIG. 12 is a front view showing a pilot plate;

FIG. 13 is a view in section taken along the line X—X in FIG. 12;

FIG. 14 is a view in section taken along the line Y—Y in FIG. 10.

DESCRIPTION OF THE PREFERRED EMBODIMENTS

Figure 1A:
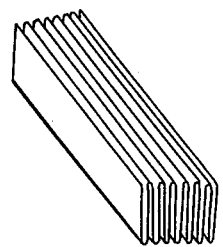
FIGS. 1A and 1B are perspective views showing pleated semipermeable membrane elements.
Figure 1B:
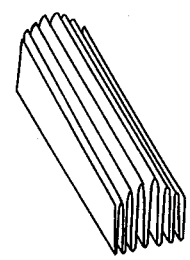
Figure 2A:
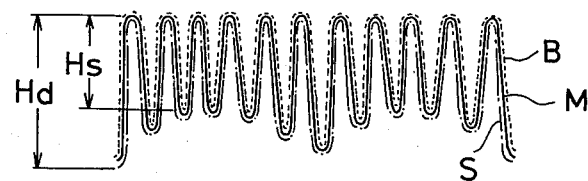
FIGS. 2A, 2B and 3 are end views showing pleated semipermeable membrane elements.
Figure 2B:
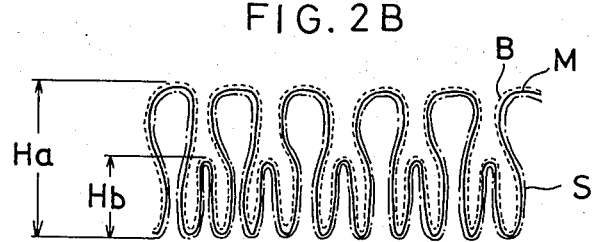
Figure 3:
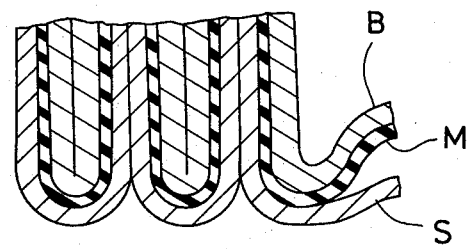

FIGS. 1A and 1B show examples of the pleated semipermeable membrane elements to be produced continuously by the apparatus of this invention. The pleats formed by folding can be uniform in height as seen in FIG. 1A or may have varying heights as seen in FIG. 1B, 2A or 2B. FIG. 3 shows the superposed structure of a pleated semipermeable membrane element. M is a semipermeable membrane made from synthetic resin. The membrane M has a spacer S in the form of a thin sheet and superposed on one side thereof providing feed channels. A cloth backing B is affixed to the other side of the membrane M. The pleated semipermeable membrane element is not limited to the structure shown in FIG. 3. A filtrate channel spacer can be provided on the other side of the membrane M lined with the cloth backing B, in which case the backing B can be dispensed with. To assure satisfactory adhesion of the membrane with an adhesive, however, it is preferable to provide the backing B at least at the opposite selvage portions of the membrane M on the other side thereof providing the filtrate channels. When having a filtration capacity of not lower than 2 m$^3$/m$^2$.day, the semipermeable membrane M should preferably be provided with a filtrate channel spacer even if having a backing B. Such a spacer may be made from a tricot processed with resin, filter paper, coarse fabric, plastic net or the like.

Figure 4:
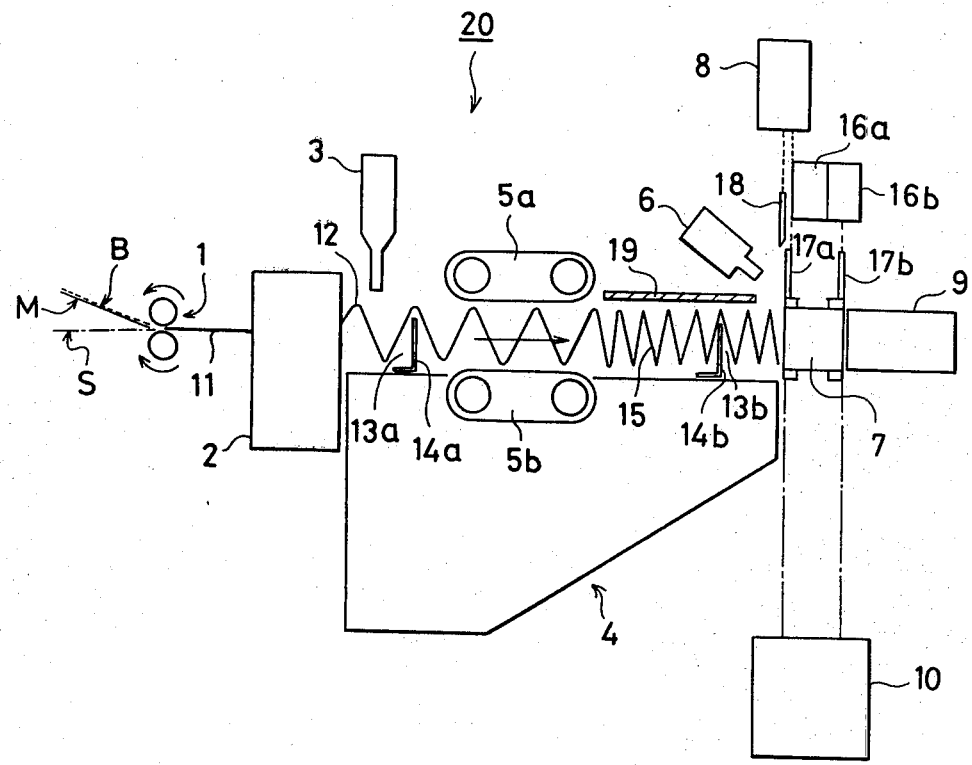
FIG. 4 is a diagram schematically showing an apparatus of this invention for continuously producing pleated semipermeable membrane elements.

FIG. 4 is an overall diagram showing an apparatus 20 for continuously producing pleated semipermeable membrane elements according to the invention. The apparatus will be described first generally with reference to FIG. 4, and the main components thereof will be thereafter described individually in greater detail.

General Arrangement and Functions

The synthetic resin semipermeable membrane M provided with a cloth backing B and shown in FIG. 4 is usually wet or dry and is positioned with the backing B up. Feeding means, which comprises feed rollers 1, feeds to folding means 2 the backing bearing semipermeable membrane M and a feed channel spacer S as an assembly 11 with the spacer S underlying the membrane M.

The folding means 2 loosely folds the assembly 11. Since membranes such as semipermeable membranes and porous membranes are delicate, and the backing or spacer is relatively elastic and rigid, the assembly 11 is loosely folded first by the folding means 2 and thereafter folded progressively more compactly to avoid possible damage to the membrane. The construction and operation of the folding means 2 will be described later in greater detail.

Adhesive applying means 3 applies an adhesive to the folded assembly 12 provided by the folding means 2, at the opposite selvage portions of one side thereof providing filtrate channels. The adhesive is applied to the assembly 11 before, in the course of the folding operation or immediately after it has been folded as indicated at 12. When there is the need to apply the adhesive to specified pleats among those formed by folding, it is desirable to apply the adhesive during or after folding, because the application of the adhesive is then easily controllable.

Transfer means 4 transports, mainly with a belt conveyor 5, the folded assembly 12 through a guide tube 19 toward a holding case 7, with a pilot plate 14a inserted in a space 13a between specified pleats of the assembly 12. Indicated at 14b is a pilot plate following the pilot plate 14a and placed in a space 13b between pleats. The transfer means 4 and the adhesive applying means 3 will be described later in greater detail.

While the folded assembly 12 is being continuously transported by the transfer means 4 toward the holding case 7 as described above, at least compressing means 9 stops this movement, with the result that the folded assembly 12 is progressively compacted and folded to a greater extent within the guide tube 19 and the holding case 7, whereby a tightly folded assembly 15 is obtained.

The portion of the assembly 15 in the holding case 7 partially passes through the case 7 into the compressing means 9. On the other hand, counter means 6 which incorporates, for example, a photocell as a detector counts the number of the pleats fed into the holding case 7. When a number of pleats specified for one semipermeable membrane element have been placed in, the counter means 6 gives an instruction to cutter means 8.

In response to the instruction, the cutter means lowers a cutting blade 18 to cut off the folded assembly 15 at the inlet of the holding case 7 and, at the same time, actuates lid closing means 16a to close a lid 17a at the inlet of the holding case 7.

Subsequently the compressing means 9 functions, pushing back into the holding case 7 the front half portion of the cut-off assembly extending into the compressing means 9, whereby the cut-off assembly having the specified number of pleats is more compactly compressed within the case 7 to an ultimate extent and thereby completely folded.

In operative relation with the compression of the cut-off assembly with the specified number of pleats by the means 9 within the holding case 7, lid closing means 16b functions to close a lid 17b at the outlet of the holding case 7.

Subsequently holding case supplying means 10 removes the holding case enclosing the completely folded assembly from the packing line comprising the folding means 2, transfer means 4, compressing means 9, etc. and replaces the case with a new empty case. In operative relation with this, the cutter means 8 raises the cutting blade 18. The new holding case is now ready for receiving another folded assembly portion 5. In this way, portions of the assembly each corresponding to one semipermeable membrane element are packed in holding cases in succession.

The holding case having the folded assembly packed therein and removed from the packing line holds the assembly compressed until the adhesive applied to the assembly has been cured.

The desired pleated semipermeable membrane elements are obtained one after another when the assembly portions are withdrawn from the holding cases upon curing of the adhesive.

Folding Means 2

As a principle, a paper folding machine or cloth folding machine manufactured, for example, by Karl Rabofsky Co. of West Germany is usable as the folding means 2, but it is desirable for this invention to use a folding mechanism having incorporated an improvement for varying the folding pitch.

Figure 5:
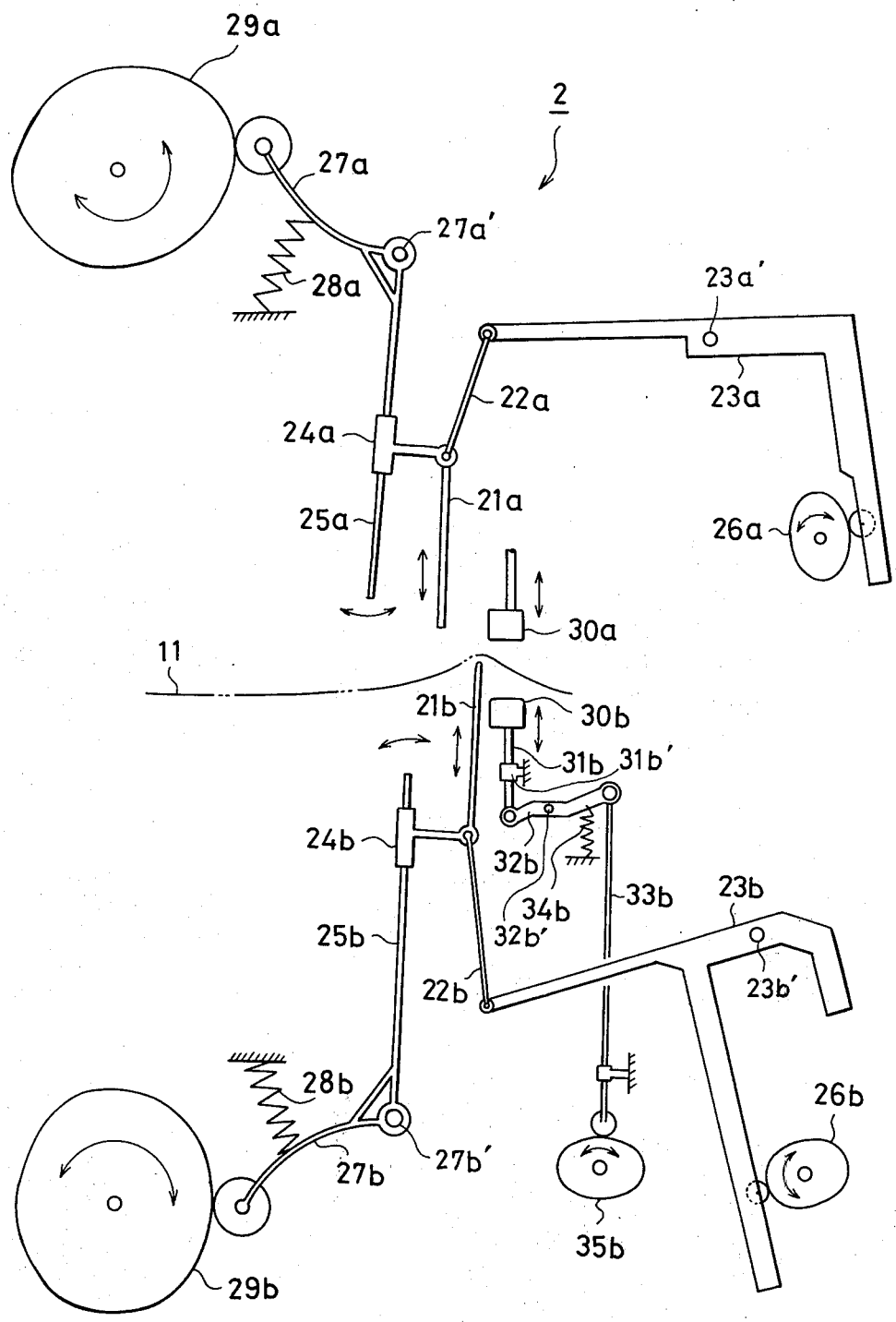
FIG. 5 is a diagram showing a folding mechanism.

FIG. 5 shows such a modified mechanism. An upper folding blade 21a is slidably supported on a rail 25a by a slider 24a extending from the upper end of the blade 21a. The upper end is pivotably connected to one end of a connecting rod 22a the other end of which is pivoted to one end of a crank 23a. The crank 23a is turnable on a support pin 23a' with the rotation of a blade cam 26a in contact with the other end of the crank 23a. Accordingly, with the rotation of the cam 26a, the upper folding blade 21a is slidable on the rail 25a upward or downward by the crank 23a and connecting rod 22a.

The rail 25a is turnably supported at its upper end by a pin 27a' and has an arm 27a extending from the upper end. The arm 27a is biased by a tension spring 28a into contact with a cam 29a at all times. Consequently the rotation of the cam 29a turns the arm 27a on the pin 27a' and thereby swings the rail 25a on the pin 27a'. As a result, the upper folding blade 21a moves upward or downward and also swings in the direction of advance of the assembly 11 by virtue of the combination of the rotation of the cam 26a and that of the cam 29a.

A lower folding blade 21b has substantially the same construction as the upper folding blade 21a. The rotation of a blade cam 26b and that of a cam 29b in combination therewith move the blade 21b upward or downward and also swing the blade 21b in the direction of advance of the assembly 11. The components of the arrangement including the lower folding blade 21b are referred to by the same reference numerals as the corresponding components of the arrangement including the upper blade 21a except that the suffix "a" is changed to "b".

An upper holding plate 30a is in combination with the lower folding blade 21b, and a lower holding plate 30b is in combination with the upper folding blade 21a to hold the assembly 11 therebetween during folding. The folding operation will be described later in greater detail.

Since the control means for the upper holding plate 30a is substantially of the same construction as the control means for the lower holding plate 30b, the former is not shown but the latter control means only is shown in FIG. 5.

The lower holding plate 30b has a connecting rod 31b extending downward from its bottom and vertically slidably supported by a guide 31b'. The rod 31b has its lower end pivoted to one end of an arm 32b, which in turn is pivotably supported, approximately at the midportion, by a pin 32b'. The other end of the arm 32b is pivoted to a rod 33b. The rod 33b has a lower end held in contact with a lower plate cam 35b at all times by a tension spring 34b. Thus the rotation of the lower cam plate 35b moves the rod 33b upward or downward, turning the arm 32b on the pin 32b' and moving the connecting rod 31b upward or downward. Consequently the lower holding plate 30b moves upward or downward.

The upper holding plate 30a, which is provided with the same construction as above, is movable upward or downward by the rotation of an unillustrated upper plate cam.

Figure 6:
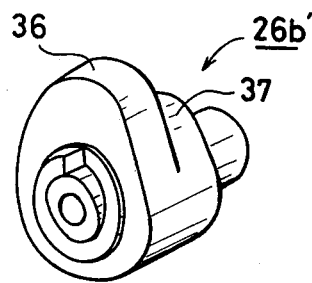
FIG. 6 is a perspective view showing a lower blade cam.
Figure 7:
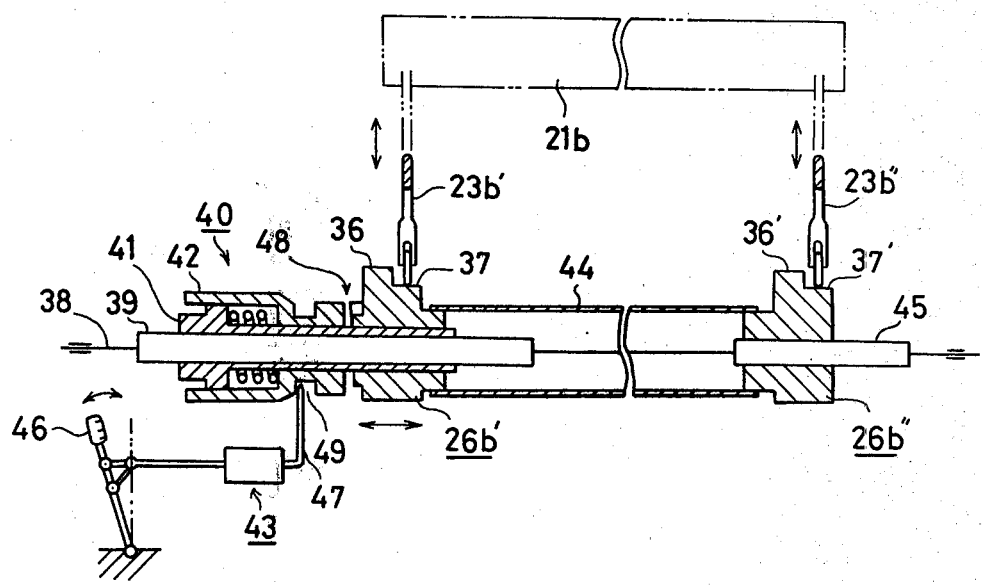
FIG. 7 is a diagram in section showing a lower blade cam change-over control mechanism.

FIG. 6 shows a lower blade cam 26b' for folding the assembly 11 into an irregularly pleated semipermeable membrane element comprising pleats of height Ha and pleats of height Hb arranged alternately as shown in FIG. 2B. Such an element can be produced by controlling the vertical movement of the lower folding blade 21b so that the assembly will be folded to two widths: one corresponding to the height Ha of pleats and the other to the height Hb of pleats. For this purpose, the lower blade cam 26b' comprises a high lift portion 36 and a low lift portion 37 which are so controlled that either one of them will be selectively brought into contact with the lower blade crank 23b. FIG. 7 shows a change-over control mechanism 40 therefor.

The change-over control mechanism 40 comprises a drive shaft 38 having a splined portion 39, a sleeve 41 slidable on the splined portion 39 only axially thereof, a shifter 42 slidable on the sleeve 41 only axially thereof, and a control portion 43 for controlling the movement of the shifter 42. The lower blade cam 26b' is rotatably mounted on the sleeve 41. Since the lower folding blade 21b has a large width approximately equal to the width of the assembly 11, it is desirable to provide the lower blade crank at each end of the lower folding blade 21b to assure stable operation. For this reason, a pair of lower blade cranks 23b' and 23b" are provided. Accordingly, in addition to the lower blade cam 26b' for the crank 23b', a lower blade cam 26b" of similar construction to the cam 26b' is provided for the crank 23b". The cams 26b' and 26b" are in phase with each other and interconnected by a tubular cam shaft 44. The cam 26b" is rotatably supported on a splined portion 45 and is axially slidable.

FIG. 7 shows a release lever 46 in its pulled position and the shifter 42 as moved away from the blade cam 26b' by the control portion 43. In this state, the sleeve 41 has been shifted to the leftmost position in FIG. 7, with the shifter 42 in its leftward shifted position in FIG. 7 while compressing a spring. With a clutch 48 in its disengaged position, the cams 26b' and 26b" are manually rotatable to set the lower folding blade 21b in the desired position. The folding mechanism 2 in this state is convenient to prepare for start-up, to clean or to adjust. When the release lever 46 is returned, the control portion 43 pushes a yoke 47 forward. The yoke 47, which is engaged in a groove 49 of the shifter 42, slidingly moves the shifter 42 on the sleeve 41, bringing the shifter 42 into engagement with the cam 26b' at the clutch portion 48. The rotation of the drive shaft 38 is now delivered through the sleeve 41 and the shifter 42 to the cam 26b', which vertically moves the blade 21b with the rotation of the low lift portion 37. This movement forms pleats of height Hb. The control portion 43, when given a signal by an unillustrated control unit, pushes the yoke 47 further forward, but since the shifter 42 is in engagement with the cam 26b' which is not slidable on the sleeve 41, the sleeve 41 slides along on the splined portion 39 rightward in FIG. 7. This brings the high lift portions 36 and 36' of the cams 26b' and 26b" into contact with the cranks 23b' and 23b". The mechanism now forms pleats of height Ha. With the changes in the vertical movement of the lower folding blade corresponding to the two folding widths, the upper holding plate 30a is also vertically controlled. The mechanism therefor is similar to the change-over control mechanism 40 described above and will be apparent from lower holding plate control means 70 included in the change-over control mechanism 50 to be described below for folding the assembly 11 into irregularly pleated semipermeable membrane elements having varying folding widths, so that the mechanism will not be described.

Figure 8:
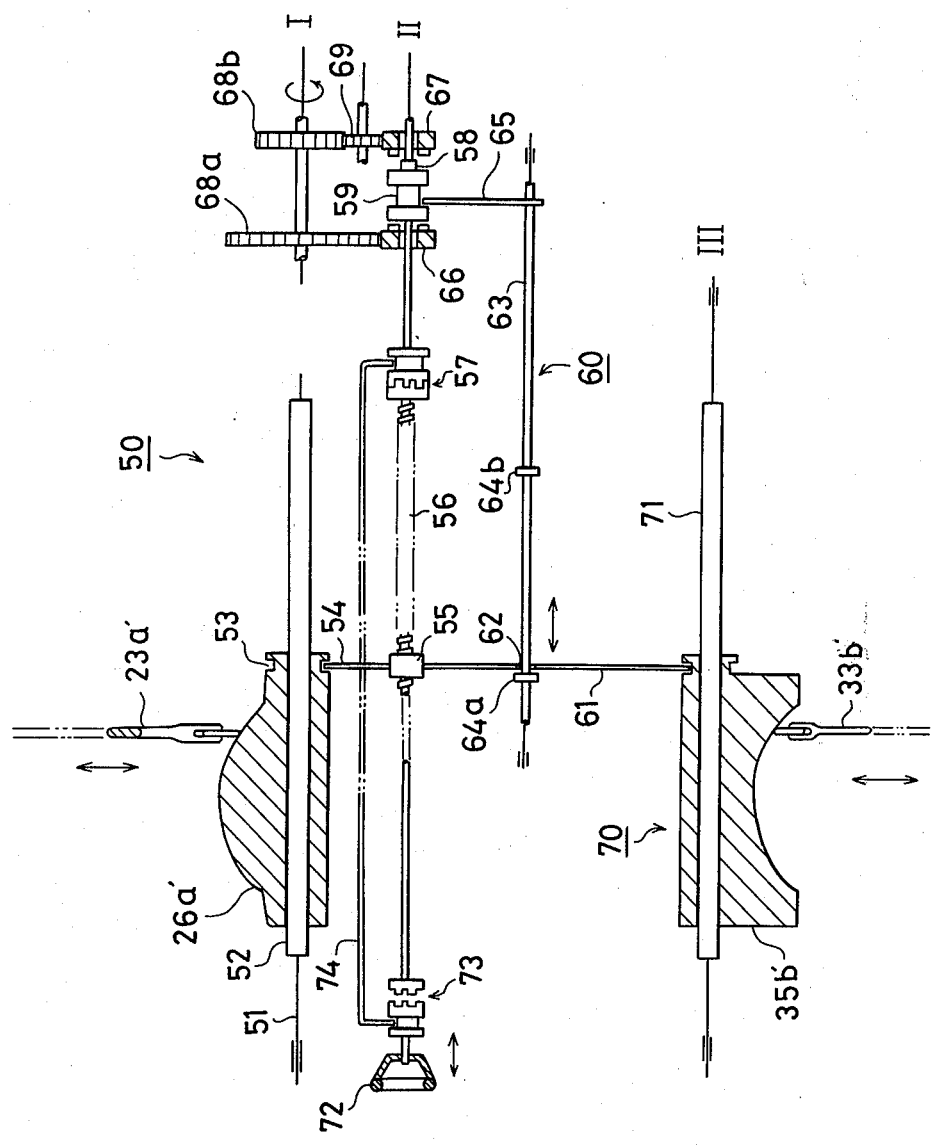
FIG. 8 is a diagram in section showing a change-over control mechanism for an upper blade cam and a lower holding plate.

FIG. 8 shows the change-over control mechanism 50 for folding the assembly 11 in continuously varying widths to obtain an element which ranges from Hs to Hd in the height of its pleats as seen in FIG. 1B or 2A. An upper blade cam 26a' mounted on a splined portion 52 of a drive shaft 51 is slidable axially thereof. The upper blade cam 26a' has a shape in conformity with the cross sectional shape of a pleated semipermeable membrane element as seen in FIG. 1B or 2A. The cam 26a', when moved along the drive shaft 51, raises the upper folding blade in corresponding relation to the heights of the pleats, namely, the folding widths.

The rotation of a screw 56 moves a nut 55, which in turn moves a yoke 54 engaged in a groove 53 in the upper blade cam 26a'. The yoke moves the blade cam. The screw 56 is right-handed, so that when it is rotated clockwise as it is seen from a clutch portion 57 toward the nut 55, the upper blade cam 26a' moves rightward in FIG. 8, whereas when the screw is rotated counterclockwise, the cam moves leftward.

A mechanism 60 for automatically changing the direction of rotation of the screw 56 comprises a rod 63 extending through a bore 62 in a yoke 61 movable with the nut 55, dogs 64a and 64b fixed to suitable portions of the rod 63, and a yoke 65. As shown in FIG. 8, it is now assumed that a clutch 59 on a splined portion 58 of a shaft II is in engagement with a gear 66, and that the rotation of a shaft I is rotating the screw 56 clockwise when it is seen in the direction from the clutch 57 toward the nut 55, by way of a gear 68a, gear 66, clutch 59, shaft II and clutch 57. The nut 55 then moves rightward in FIG. 8 and moves the yokes 54 and 61 in the same direction. After moving rightward some distance, the yoke 61 comes into contact with the dog 64b and pushes the rod 63 rightward. The yoke 65 therefore pushes the clutch 59 out of engagement with the gear 66 and brings the clutch 59 into engagement with a gear 67. Since the rotation of the shaft I is delivered from a gear 68b to the gear 67 via an intermediate gear 69, the gear 67 rotates in a direction opposite to the gear 66. Consequently the screw 56 now rotates reversely in a counterclockwise direction, moving the nut 55 leftward in FIG. 8. Similarly when the nut 55 has moved leftward some distance, the dog 64a changes the direction of rotation of the screw 56 again. In this way, the automatic changing mechanism 60 automatically changes the direction of rotation of the screw 56, controlling the range of the leftward of rightward movement of the nut 55.

The movement of the nut 55 and the yoke 54 moves the upper blade cam 26a', causing the crank 23a' to raise the upper folding blade 21a as desired. As already mentioned with reference to the change-over control mechanism 40, there is the need to raise the lower holding plate 30b in timed relation with this movement to a position to meet the tip of the upper folding blade 21a, such that the upper folding blade and the lower holding plate are moved toward or away from each other simultaneously. Indicated at 70 is means for controlling the lower holding plate in this way. The means 70 comprises a shaft III which, as a rule, is rotatable at the same speed as the shaft 51 and has a splined portion 71, and a lower plate cam 35b' mounted for axial sliding movement on the splined portion 71. The lower plate cam 35b' has a shape complementary to that of the upper blade cam 26a'. As seen in FIG. 8, for example, the contour of an axial section of the upper blade cam 26a' at a specified position is complementary to the contour of an axial section of the lower plate cam 35b' at a specified position. In this case, the lower plate cam 35b' is moved in timed relation with the upper blade cam 26a' over the same distance by the yoke 61 to raise the rod 33b' always in conformity with the amount by which the upper blade crank 23a' is raised by the upper blade cam 26a'.

When a hand wheel 72 is pushed to engage a clutch 73 and cause a tie bar 74 to disengage the clutch 57, the screw 56 is rotatable by turning the hand wheel 72 by hand, whereby the upper blade cam 26a' is suitably movable to set the same in the desired position.

The upper blade cam 26a can be held in contact with the crank 23a, and the lower blade cam 26b with the crank 23b by suitably shaping the desired component in balance or with use of a spring, weight, power cylinder, grooved cam or the like.

It is desired that the opposite surfaces of the folding blades 21a, 21b and the surfaces of the holding plates 30a, 30b adapted to contact the assembly 11 be embossed to a coarse texture, or formed with a large number of fine grooves or provided with a plastic net to reduce the area of contact therebetween and thereby minimize the friction involved. This is especially effective in preventing a wet membrane from intimately adhering to such a surface due to the presence of water to thereby preclude improper folding.

The assembly 11 is folded in the manner illustrated in FIGS. 9A to 9J.

Figure 9A:
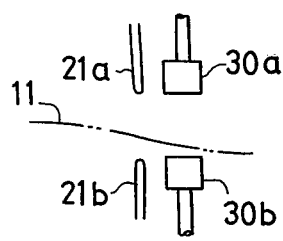
FIGS. 9A to 9J are diagrams showing a folding operation.

First, the upper and lower folding blades 21a and 21b are held spaced apart by some distance, and the assembly 11 is passed between these blades and placed into the transfer means 4 by hand so that the assembly will not be drawn backward by the folding operation (FIG. 9A).

The folding means 2 is then initiated into operation. The folding operation involves the steps illustrated in FIGS. 9B to 9J and to be repeated cyclically, and the state in which the means 2 is started up is not limited to one of these steps. For the convenience of description, however, it is assumed that the means 2 is started up with the rise of the lower folding blade 21b.

Figure 9B:
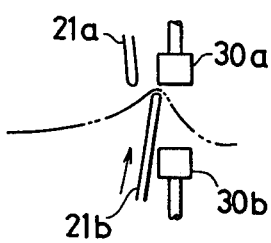

Thus the lower folding blade 21b rises while swinging and holds the assembly 11 between the blade 21b and the upper holding plate 30a (FIG. 9B).

Figure 9C:
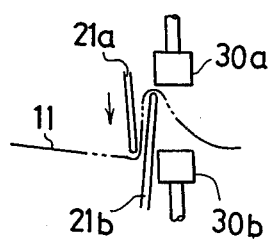

The upper folding blade 21a lowers by a distance corresponding to the specified folding width (FIG. 9C).

Figure 9D:
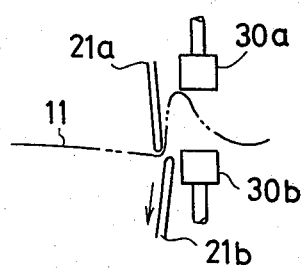
Figure 9E:
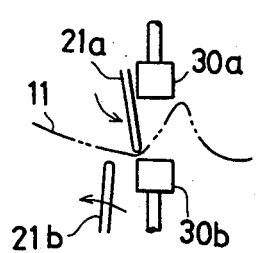

The lower folding blade 21b lowers, and at the same time, the upper folding blade 21a lowers while swinging to hold the assembly 11 between the blade 21a and the lower holding plate 30b (FIGS. 9D and 9E).

The lower folding blade 21b rises by an amount corresponding to the specified width.

When the folding width is constant, the upper folding blade 21a rises, and at the same time, the lower folding blade 21b rises while swinging to hold the assembly 11 between the blade 21b and the upper holding plate 30a. The folding means is now in the state of FIG. 9B again. The above steps are thereafter repeated.

Figure 9F:
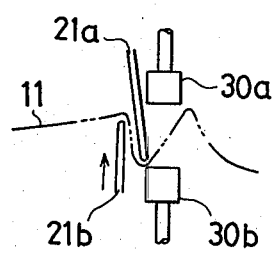

When the assembly 11 is to be folded in an altered width, the lower folding blade 21b, for example, rises to a lower level in FIG. 9F. In accordance therewith, the upper holding plate 30a lowers.

Figure 9G:
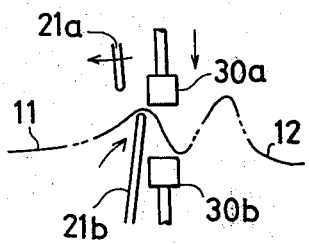

The upper folding blade 21a rises, and the lower folding blade 21b swings to hold the assembly 11 between the blade 21b and the upper holding plate 30a (FIG. 9G).

Figure 9H:
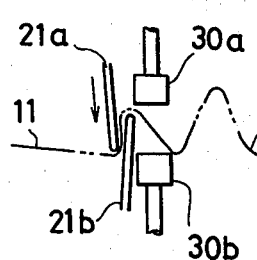

The upper folding blade 21a lowers (FIG. 9H).

Figure 9I:
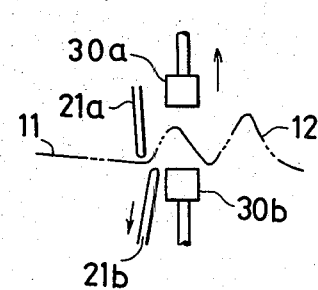
Figure 9J:
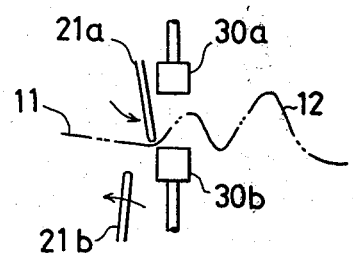

The lower folding blade 21b lowers, and the upper holding plate 30a rises to the previous position. The upper folding blade 21a then swings to hold the assembly 11 between the blade 21a and the lower holding plate 30b (FIGS. 9I and 9J).

In this way, pleats of reduced height are formed.

Adhesive Applying Means 3

Figure 10:
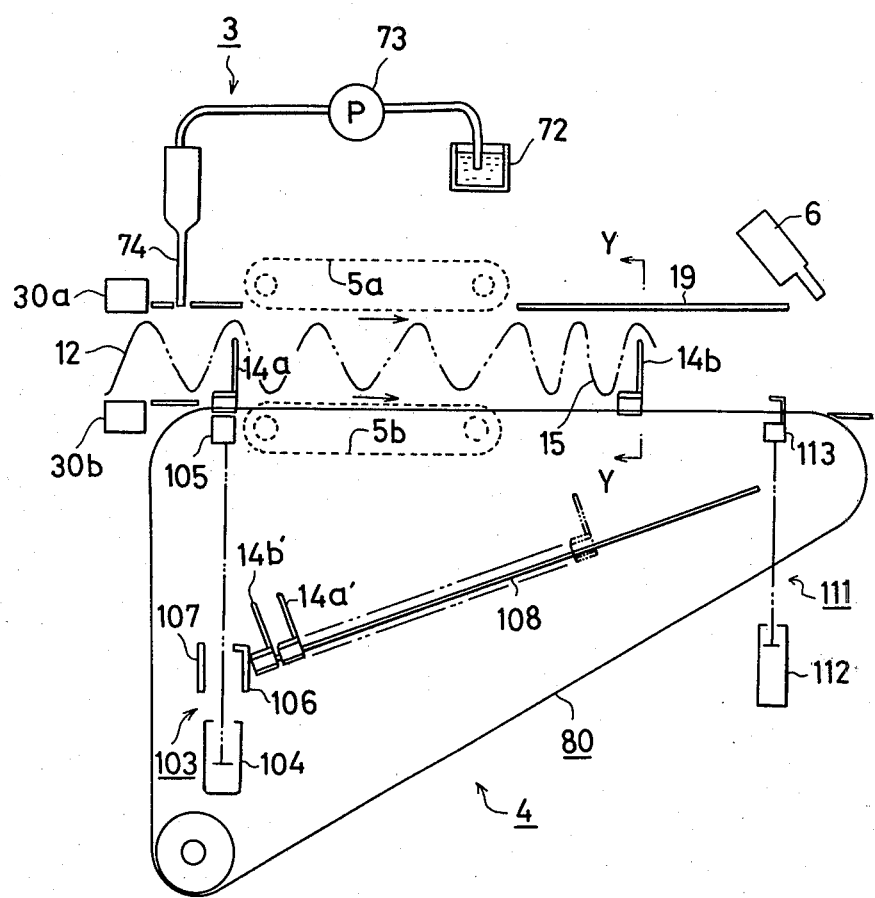
FIG. 10 is a diagram schematically showing adhesive applying means, transfer means and counter means.

Referring to FIG. 10, the adhesive applying means 3 comprises an adhesive tank 72, a gear pump 73 and a nozzle 74 as shown in FIG. 10. Useful adhesives are epoxy resin, polyurethane resin, silicone resin, etc.

When there is the need to distinguish the pleats of the folded assembly 12 to which an adhesive is to be applied from the other pleats thereof to which no adhesive is to be applied, it is desirable to operate the applying means in operative relation with a detector, such as one comprising a photocell or limit switch, for identifying the desired pleats. The simplest method is to operate the applying means with a time delay relative to the folding means 2, such that when a particular pleat formed by the folding means 2 has come to the applying means 3, the adhesive is applied to the pleat.

Transfer Means 4

The transfer means 4 is interposed between the folding means 2 and the holding case 7. The assembly 12 which has been loosely folded by the folding means 2 is thereafter transported toward the holding case 7 at least over a predetermined distance and placed into the case while being folded more compactly. The construction of the transfer means will be described below in greater detail with reference to FIGS. 10 to 16.

The transfer means 4 comprises two pairs of guide chains, namely, a pair of guide chains 75a and 75b and another pair of guide chains 76a and 76b, at least four pilot plates 14a, 14a', 14b and 14b', means 103 for attaching the pilot plate to the guide chains, means 111 for removing the pilot plate from the guide chains, and a pair of upper and lower belt conveyors 5a and 5b.

Each pair of the guide chains is driven independently of the other pair by frictional power transmission permitting slippage. The pilot plate is inserted into the space between two specified pleats of the folded assembly 12 and attached to the specified pair of guide chains to push the folded assembly 12 toward the holding case 7. As the folded assembly is further folded more compactly producing increasing resistance, slippage occurs to impede the travel of the guide chains, consequently reducing the speed of travel of the pilot plate. In other words, the guide chains are adapted to be driven with slippage to alter the speed of travel of the pilot plate. Consequently some pilot plates placed between pleats of the folded assembly 12 travel at different speeds, so that the pilot plates inserted in the folded assembly should be driven by independent pairs of guide chains respectively.

The folded assembly 12 will not always be transported properly only with the guide chains because they are driven with slippage, whereas the folded assembly 12, upon delivery from the folding means 2, should thereafter be transported properly at least over a specified distance because otherwise difficulties would be encountered in applying the adhesive to the assembly or in further folding the assembly. The belt conveyors are provided to assure proper travel of the folded assembly 12. The upper conveyor is adapted to contact the upper folds of the assembly 12, while the lower belt conveyor is designed to contact the lower folds or the bottom of the pilot plate.

Figure 11:
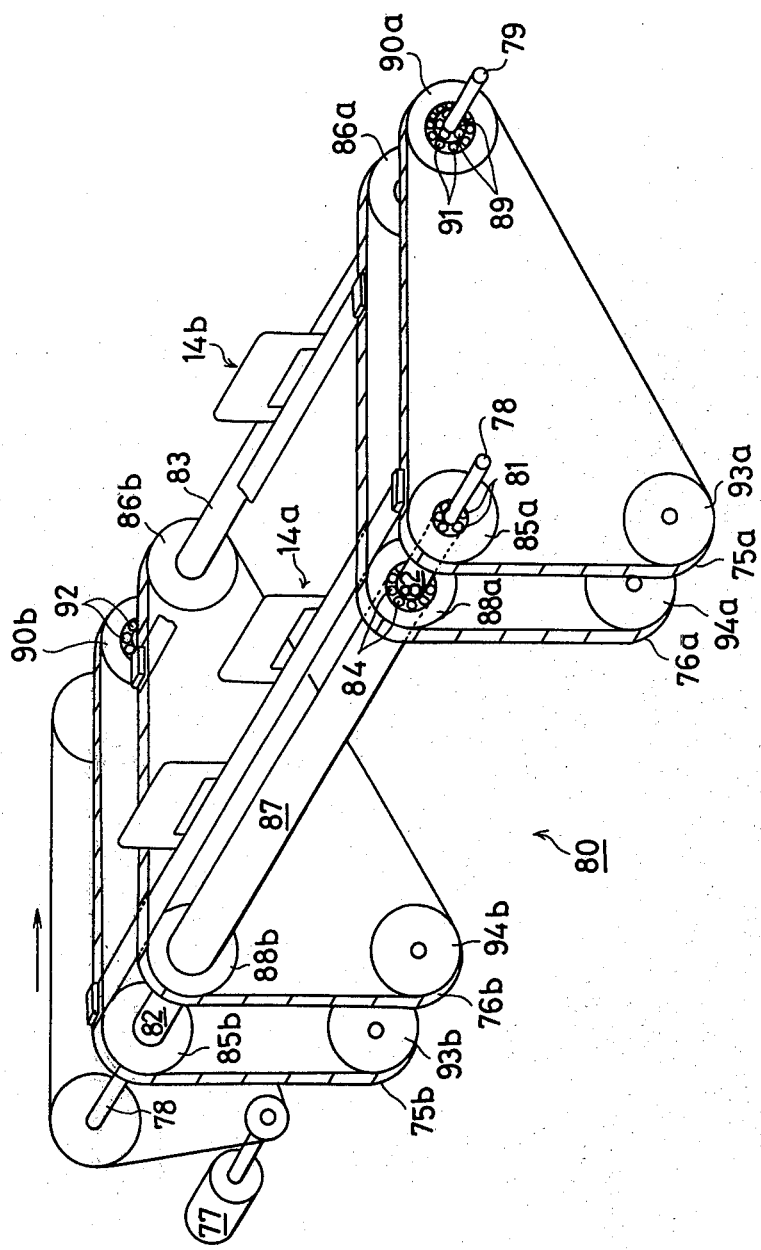
FIG. 11 is a perspective view showing a guide chain assembly of the transfer means.

FIG. 11 shows an arrangement 80 including the guide chains and a drive mechanism therefor. A motor 77 drives two rotary shafts 78 and 79. Through rollers 81 involving frictional torque transmission, the shaft 78 drives a shaft 82 concentric therewith. The rotary shaft 79 drives a shaft 83 concentric therewith by means of rollers 89 through frictional power transmission. Sprocket wheels 85a and 85b are mounted on the shaft 82, whereby the guide chains 75a and 75b are driven. The shaft 83 is provided with sprocket wheels 86a and 86b which drive the guide chains 76a and 76b.

A shaft 87 concentric with the shaft 82 is thereby supported with rollers 84 provided therebetween. Sprocket wheels 88a and 88b are mounted on the shaft 87. The sprocket wheels 88a and 88b give an auxiliary drive force to the guide chains 76a and 76b. Sprocket wheels 90a and 90b, supported by rollers 91 and 92 on the shaft 83, impart an auxiliary drive force to the guide chains 75a and 75b.

Sprocket wheels 93a, 94a, 93b and 94b on the lower portions of the guide chains 75a, 76a, 75b and 76b are individually supported independently to hold the guide chains under suitable tension.

In this way, the guide chains are adapted to be driven by frictional power transmission and allowed to slip.

FIG. 12 shows a pilot plate 14b which is adapted to be provided between and attached to the pair of guide chains 76a and 76b. Another pilot plate 14b' has exactly the same construction as the plate 14b.

A base 100 has stepped portions 95a, 95b, upright leaves 98, and catches 96, 97 at its opposite ends. Each leaf 98 has an aperture 99. Support portions 101, 102a and 102b are provided on the base except the ends and except where the leaves 98 are positioned.

The pilot plates 14a and 14a' to be attached to the other pair of guide chains 75a and 75b have nearly the same construction as the pilot plates 14b and 14b' except that the distance l between the catches 96 and 97 of the pilot plates 14b and 14b' corresponds to the distance between the guide chains 76a and 76b, whereas that distance of the pilot plates 14a and 14a' corresponds to the distance between the guide chains 75a and 75b.

As shown in FIG. 10, the means 103 for attaching the pilot plate to the guide chains comprises, for example, a power cylinder 104, a saddle 105, a hook 106 and a stopper 107. When the saddle 105 is pulled down to the lowest position, the hook 106 is also moved down at the same time, permitting a pilot plate on a rail 108 to slidingly ride the saddle 105. The stopper 107 serves to retain the pilot plate on the saddle 105 against falling off and positions the pilot plate properly on the saddle 105, permitting the pilot plate to prevent another pilot plate from slipping off the rail 108. When the saddle 105 carrying the pilot plate thereon is raised by the power cylinder 104, the hook 106 projects at the same time to hold the next pilot plate. The pilot plate raised with the saddle 105 is pushed by the saddle 105 with controlled timing so that the leaves 98 are inserted into the space between the specified pleats of the folded assembly with the catches 96 and 97 engaged in and attached to the guide chains. In the case where the folded assembly 12 has upper folds positioned at the same level as seen in FIG. 1A or 2A, the timing is so controlled that the leaves 98 will not push up the lower folds of some pleats and that the pilot plate is inserted in place for each specified number of pleats. However, when the folded assembly 12 has upper folds at different levels as shown in FIG. 2B, the timing must fulfill the requirement that the pilot plate is inserted into the pleat having the highest upper fold, in addition to the above requirements. The timing with which the pilot plate is inserted into the folded assembly 12 may be determined by detecting the movement of the assembly 12 directly as with a photocell which is provided solely for this purpose, or may be determined in operative relation with the folding means 2 or adhesive applying means 3.

FIG. 11 shows pilots plates as attached to the guide chains with their catches 96 and 97 engaged in the chains. It is seen that the pilot plate 14a is attached to the guide chains 75a and 75b, and that the plate 14b is attached to the guide chains 76a and 76b.

The pilot plate attached to the guide chain is driven while being allowed to slip as already described, and leaves the saddle 105 and moves onto the belt conveyor 5b as the folded assembly 12 is sent forward by the belt conveyors 5a and 5b of the transfer means 4.

The upper belt conveyor 5a is adapted to contact the upper folds of the folded assembly 12 and acts to move the assembly 12 toward the holding case 7. The lower belt conveyor 5b comes into contact with the lower folds of the assembly 12 or with the base 100 of the pilot plate, acting to move the assembly 12 toward the holding case 7. For the transport operation, the lower belt conveyor 5b must be movable up and down such that during the passage of the pilot plate, it is held depressed approximately by the thickness of the base 100 but is thereafter raised to the original position, or must be elastically deformable easily in the direction of the thickness of the belt.

After passing between the belt conveyors 5a and 5b, the folded assembly enters the guide tube 19, whereupon the folded assembly slows down since the belt conveyors 5a and 5b no longer act to move the folded portion within the tube 19. However, because the belt conveyors 5a and 5b continuously force the following portion of the folded assembly into the guide tube 19, the preceding portion is pushed and folded to a greater extent into a tightly folded portion 15. The compactly folded portion is formed further because the compressing means 9 stops the movement of the folded portion as already stated and also because the cutting blade 18 stops the folded assembly as will be described later.

FIG. 14 is a view in section taken along the line Y—Y in FIG. 10. The pilot plate 14b is held attached to the guide chains 76a and 76b by the engagement of the catches 96 and 97 with these chains. Indicated at 109 are chain guards, and at 110 rails. As seen in FIG. 14, the guide tube 19, where it comes into contact with the assembly 15, is embossed to a coarse texture, or formed with many fine grooves, or provided with a plastic net affixed thereto to reduce the area of contact with the assembly. As is the case with the folding blades 21a, 21b and holding plates 30a, 30b, this serves to reduce the friction involved for use with a wet membrane, preventing the assembly 15 from intimately adhering to the surface due to the presence of water to thereby preclude failure in the movement of the assembly 15.

The pilot plate thus sent forward is withdrawn from the pleat, namely, is detached from the guide chains at a position immediately before the holding case 7. The means 111 for removing the pilot plate from the guide chains comprises a power cylinder 112 and a head 113 as shown in FIG. 10. The operation of the means 111 will be described with reference to FIGS. 15 and 16.

Figure 15:
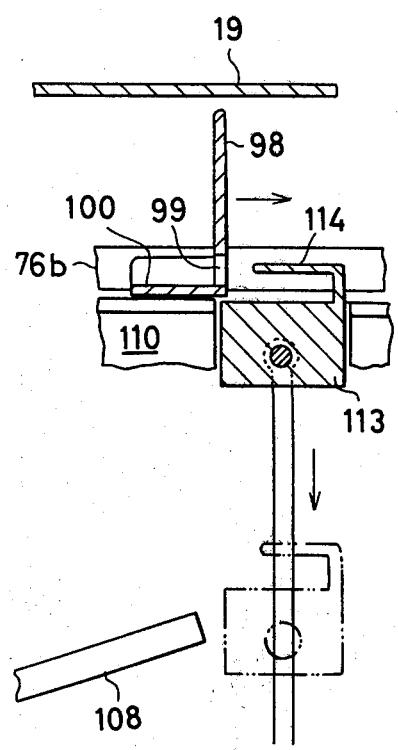
FIGS. 15 and 16 are diagrams showing the operation of means for removing the pilot plate from guide chains.
Figure 16:
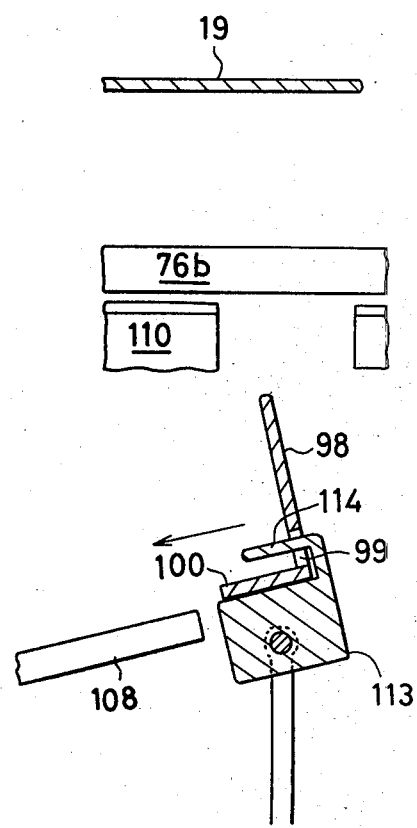

The head 113 is located usually in the position shown in FIG. 15. When the pilot plate is to pass the position of the head 113 along with the folded assembly 15, hook plates 114 of the head 113 engage in the apertures 99 in a lower portion of the pilot plate. The power cylinder 112 then pulls down the head 113, which pulls the pilot plate with its hook plates 114 and disengages the pilot plate from the guide chains. When the head 113 carrying the pilot plate is lowered to a predetermined position, the head 113 is inclined as shown in FIG. 16, allowing the pilot plate to slip off onto the rail 108. The head is thereafter raised to the original position. The pilot plate slides along on the rail 108 and stops at the standby position shown in FIG. 10 and is now ready for attachment to the guide chains. To enable the pilot plate to slide down the rail 108 smoothly, the rail 108 can be finely vibrated by a vibrator, or a jet of air or roller conveyor is usable. If the pilot plate is adapted to slide down the rail 108 over a long distance, the pilot plate will change its direction during sliding and is likely to fall off the rail. Thus the sliding distance is preferably shorter. Accordingly it is preferable to use a large number of pilot plates so that pilot plates are aligned on the rail 108 at all times over a substantial distance from the lower end of the rail to an upper portion thereof.

Although the transfer means described includes two pairs of guide chains, three or more pairs of guide chains may be used, in which case there arises the need to use several kinds of pilot plates, with the catch-to-catch distances thereof corresponding to the chain-to-chain distances of the respective pairs. When many pilot plates are employed, pilot plates must not be attached to the same guide chains in succession.

Holding Case 7 and Means 10 for Supplying Same

The holding case 7 is adapted to hold therein a folded portion of assembly corresponding to one pleated semipermeable membrane element until the adhesive has been cured. Preferably the case is a tubular member having a cross section capable of accommodating the largest pleat of the semipermeable membrane element. Of the two open ends of the tubular member, one serves as the inlet for the folded assembly, and the other as the outlet. When the counter means 6 has detected that a specified number of pleats of the folded assembly have been placed into the holding case through the inlet, the cutter means 8, resembling for example a guillotine, cut the folded assembly at a position immediately before the inlet, and the inlet lid of the holding case is closed in timed relation with this. Although the folded assembly 15 has been folded compactly by the transfer means 4, the assembly will partly project from the case outlet and still remains to be fully folded. Accordingly the compressing means 9 pushes the projecting part back into the holding case and compresses the assembly within the case. In operative relation with this, the outlet lid of the case is closed. In this way, the folded portion of the assembly corresponding to one pleated semipermeable membrane element is packed in the holding case in a compressed state.

The holding case supplying means 10 selects one of many empty holding cases and supplies the selected case to the folding and packing line comprising the folding means 2, adhesive applying means 3, transfer means 4, compressing means 9, etc. to pack the folded assembly portion in the case.

Figure 17:
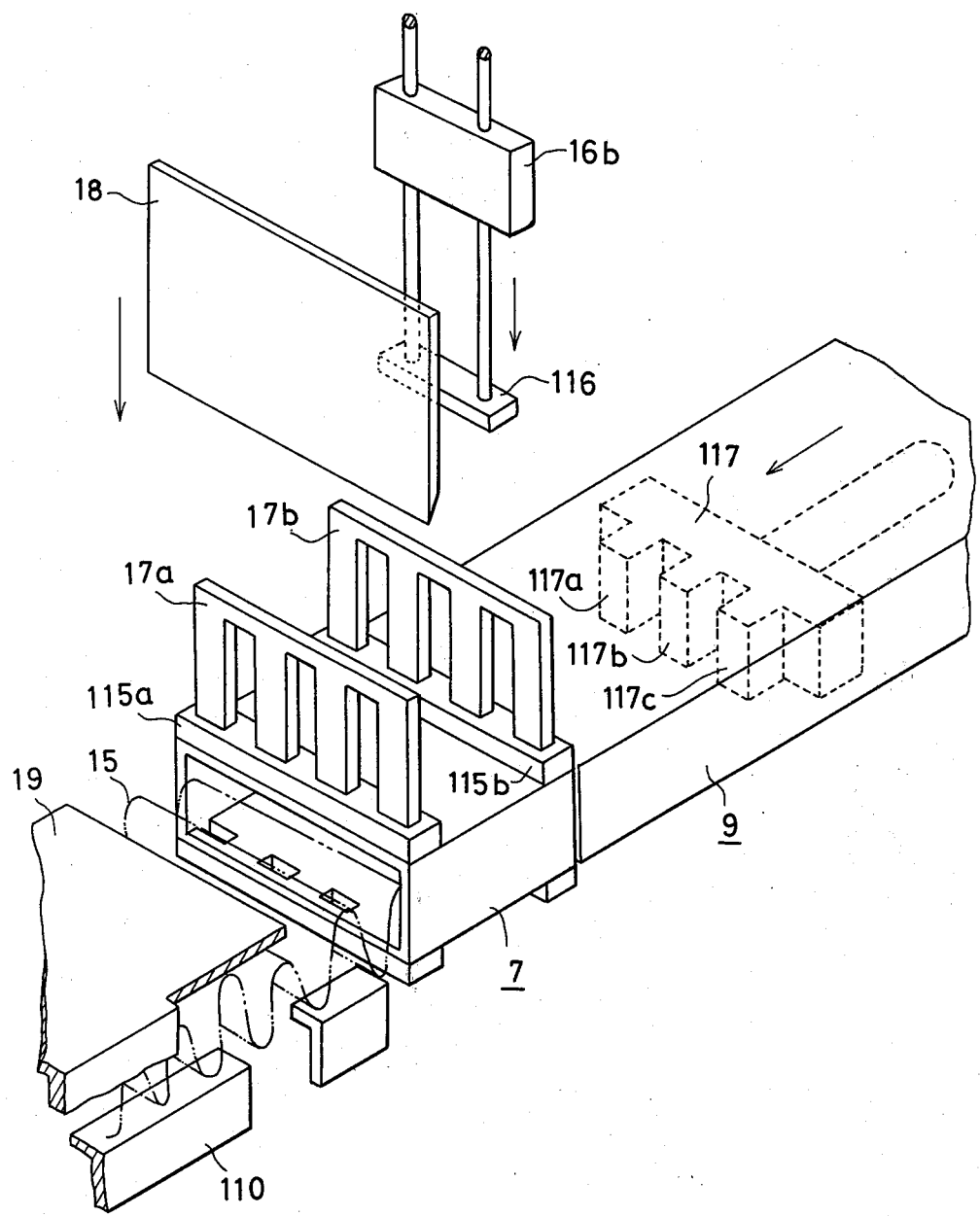
FIG. 17 is a perspective view showing a holding case, a portion of compressing means, cutting blade and lid closing means.

The holding case 7 and the supplying means 10 will be described below more specifically with reference to FIGS. 17 and 18.

The holding case 7 is a rectangular tube for example about 27 mm in height, about 950 mm in width and about 65 mm in length and has inlet and outlet openings at the longitudinally opposed ends. Although the inlet is not different from the outlet in structure, the opening for receiving the folded assembly 15 is the inlet, and the other opening is the outlet. The lids 17a and 17b are slidingly raised and are retainable in the raised position by the frictional force of springs housed in lid boxes 115a and 115b.

The lids are openable or closable manually or automatically. The illustrated embodiment has lid closing means 16a and 16b, while the lids are manually opened.

The lid closing means 16b, which is operatively associated with the compressing means 9, lowers a piston 116 on completion of compression, forcing down the lid 17b for closing. FIG. 17 does not show the closing means 16a for the lid 17a since it is of the same construction as the means 16b except that the means 16a functions to close the lid 17a after the cutting blade 18 has been lowered.

The outlet lid 17b must be closed while the folded assembly is held compressed by the compressing means 9. Accordingly the compressing means comprises a piston 117 having a plurality of projections 117a, 117b and 117c. The lid 17b is partially cut out in the form of a comb in corresponding relation to the projections 117a, 117b and 117c of the piston 117.

Figure 18:
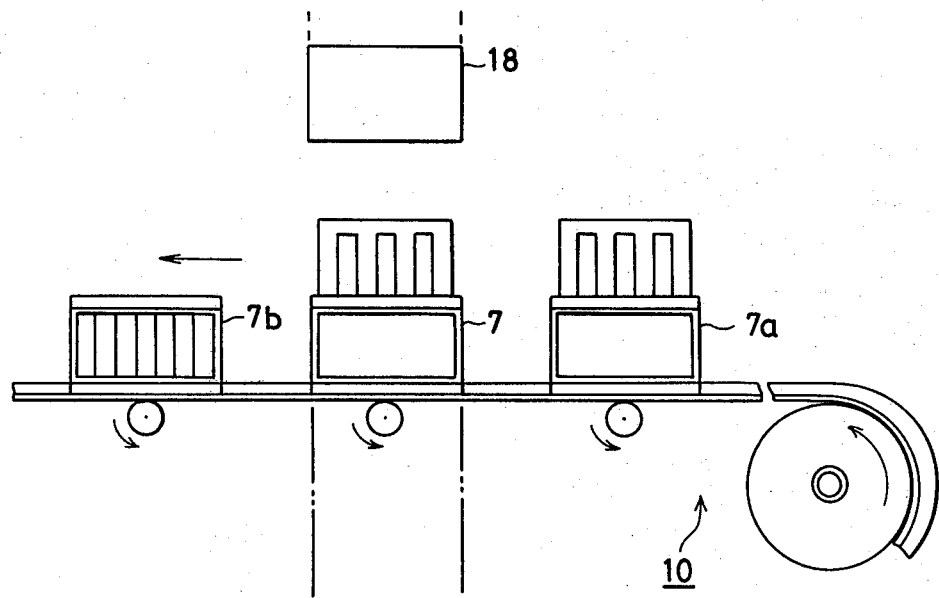
FIG. 18 is a fragmentary front view showing holding case changing means, holding cases and cutting blade.

As shown in FIG. 18, the holding case supplying means 10 can be a belt conveyor, for example. A large number of holding cases are aligned on the conveyor with their lids opened. Folded assembly portions are packed into the holding cases one after another, such that a case is sent to the packing position every time one case has been packed. In FIG. 18, indicated at 7 is the holding case into which the assembly is being packed, at 7a the case to be packed subsequently, and at 7b a case having the assembly already packed therein.

The main components of the apparatus 20 of this invention for continuously producing pleated semipermeable membrane elements have been described above individually, along with the overall processing operation. The encased folded assembly delivered from the apparatus 20 must be allowed to stand for the curing of the adhesive to finish it as a complete semipermeable membrane element. Thus the folded assembly requires not a short period of time for finishing. However, the present apparatus, once initiated into operation, provides uncured elements one after another. Consequently cured elements can be obtained one after another. The present apparatus therefore affords pleated semipermeable membrane elements in succession by a continuous operation. The apparatus 20 is further capable of producing irregularly shaped pleated semipermeable membrane elements, while the membrane to be processed may be either dry or wet.

What is claimed is:

1. An apparatus for continuously producing pleated semipermeable membrane elements comprising means for continuously feeding a strip of assembly composed of a synthetic resin semipermeable membrane and a spacer in the form of a thin sheet and superposed on at least one side of the semipermeable membrane; folding means having a pair of upper and lower folding blades for loosely folding the assembly fed by the feeding means; adhesive applying means disposed within, or to the front or rear of the folding means for applying an adhesive to the opposite selvage portions of the assembly on one side thereof; holding cases each having an openable lid at each of its inlet and outlet; transfer means for placing the folded portion of the assembly into one of the holding cases while progressively folding the assembly more compactly, said transfer means comprising a plurality of pilot plates insertable between pleats of the folded assembly, at least two pairs of guide chains operable by frictional power transmission for moving the pilot plates as supported vertically thereon, means for attaching the pilot plates to the guide chains at a specified spacing and removing the pilot plates from the guide chains, and a pair of upper and lower belt conveyors positionable above and under the folded assembly and approximately equal to the folded assembly in width; counter means disposed in the vicinity of the inlet of the holding case for counting the number of the pleats of the folded assembly; cutter means disposed on the inlet side of the holding case for cutting the folded assembly; compressing means disposed on the outlet side of the holding case for compressing the folded assembly in the holding case; and means for selecting said one of the holding cases and supplying the same.

2. An apparatus as defined in claim 1 wherein the transfer means is provided with a guide tube disposed to the rear of the belt conveyors and in front of the holding case.

3. An apparatus as defined in claim 2, wherein the inside surface of the guide tube is roughened to avoid intimate contact with the folded assembly.

4. An apparatus for continuously producing pleated semipermeable membrane elements comprising means for continuously feeding a strip of assembly composed of a synthetic resin semipermeable membrane and a spacer in the form of a thin sheet and superposed on at least one side of the semipermeable membrane; folding means having a pair of upper and lower folding blades for loosely folding the assembly fed by the feeding means, a pair of upper and lower reciprocating holding plates for holding the assembly, and means for controlling the movement of the holding plates in accordance with the desired width of the assembly; adhesive applying means disposed within, or to the front or rear of the folding means for applying an adhesive to the opposite selvage portions of the assembly on one side thereof; holding cases each having an openable lid at each of its inlet and outlet; transfer means for placing the folded portion of the assembly into one of the holding cases while progressively folding the assembly more compactly; counter means disposed in the vicinity of the inlet of the holding case for counting the number of the pleats of the folded assembly; cutter means disposed on the inlet side of the holding case for cutting the folded assembly; compressing means disposed on the outlet side of the holding case for compressing the folded assembly in the holding case; and means for selecting said one of the holding cases and supplying the same.

5. An apparatus as defined in claim 4, wherein said controlling means moves said holding plates for producing an assembly having pleats of uniform width.

6. An apparatus as defined in claim 4, further comprising means for controlling the movement of said folding blades in coordination with said holding plate controlling means for providing an assembly wherein alternate pleats have different widths.

7. An apparatus as defined in claim 6, wherein said controlling means for said holding plates and said folding blades comprise rotating cam members having a first circumferential surface and a second, different circumferential surface, said holding blades and holding plates alternately engaging said first and second surfaces whereby the extent of reciprocation of said blades and plates is alternately varied; and means for controlling the movement of said cam members relative to said holding plates and folding blades for providing said alternate engagement.

8. An apparatus as defined in claim 4, further comprising means for controlling the movement of said folding blades in coordination with said holding plate controlling means for providing an assembly having pleats of continuously varying widths.

9. An apparatus as defined in claim 8, wherein said controlling means for said holding plates and said folding blades comprise arcuate surfaces, said holding plates and folding blades being relatively moveable back and forth along said arcuate surfaces whereby the extent of reciprocation of said blades and plates is continuously varied; and means for controlling the movement of said arcuate surfaces relative to said holding plates and folding blades for providing said back and forth movement.

10. An apparatus as defined in claim 8, wherein both sides of the folding blades and the surfaces of the holding plates are roughened to avoid intimate contact with the assembly.

11. An apparatus as defined in claim 1 or 4, wherein the lid at the outlet end of said holding cases comprises a plurality of spaced members; and wherein said compressing means comprises a member insertable through the spaces between the members of the outlet lid whereby said assembly may be compressed in said holding cases with said outlet lids closed.

12. An apparatus as defined in claims 1 or 4, wherein the means for selecting one of the holding cases and supplying the same comprises a belt conveyor for placing a large number of the holding cases thereon, the belt conveyor being movable when a portion of the assembly corresponding to one element has been packed into one of the holding cases to render another one of the holding cases.

* * * * *